June 12, 1945.　　　A. R. LEE　　　2,378,226
ALTIMETER
Filed Nov. 20, 1943
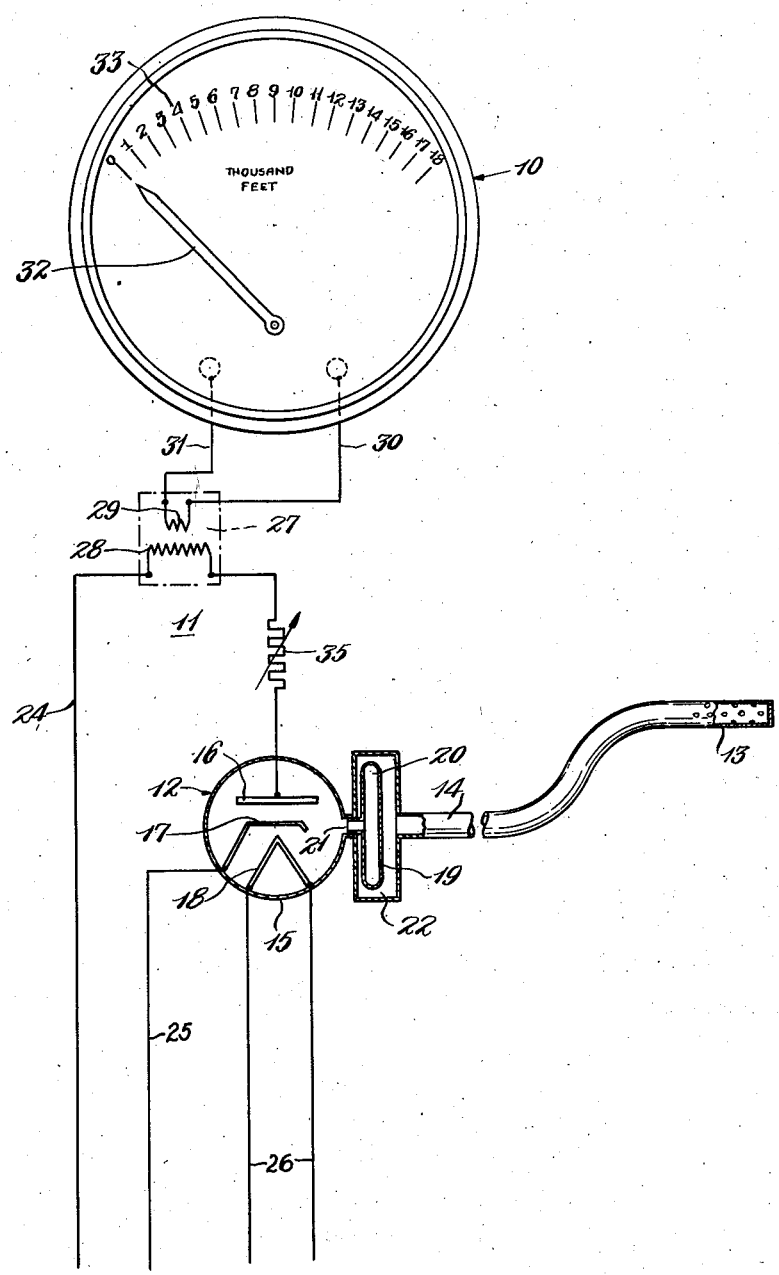
INVENTOR.
ASA REN LEE
BY
Kivis Hudson, Boughton & Williams
ATTORNEYS Patented June 12, 1945

2,378,226

UNITED STATES PATENT OFFICE 2,378,226

ALTIMETER

Asa Ren Lee, Cleveland, Ohio, assignor to Designers For Industry, Inc., Cleveland, Ohio, a corporation of Ohio Application November 20, 1943, Serial No. 511,166

6 Claims. (Cl. 73—384)

This invention relates to indicating instruments and as one of its objects aims to provide a novel form of indicating instrument which is responsive to changes in the pressure of a fluid and with which such changes can be indicated in a direct and accurate manner.

Another object of my invention is to provide a novel indicating instrument containing a meter and a control or actuating means therefor embodying an electron tube which is responsive to changes in the pressure of the atmosphere or other fluid.

A further object of my invention is to provide a novel indicating instrument of the character mentioned which is well suited for use as an altimeter on aircraft of various kinds.

Other objects and advantages of the invention will be apparent from the following description and the accompanying drawing.

The single view presented in the drawing is a diagrammatic representation of an indicating instrument embodying my invention.

My novel indicating instrument can be applied to various uses where it is desirable that an accurate indication be quickly given of a change occurring in the pressure of a fluid. The embodiment of the invention shown in the drawing is especially suitable for use as an altimeter on aircraft. The invention is hereinafter described as being used in that connection wherein the change in fluid pressure is a change in the pressure of the atmosphere due to a change in altitude. As shown in the drawing, the altimeter comprises a meter or indicator 10 and an electron tube apparatus 11 for actuating or controlling the meter. The apparatus 11 includes an electron tube 12 which is connected with a static tube 13 by the conduit 14 and, as explained more in detail hereinafter, responds to changes in the pressure of the atmosphere due to changes in altitude. The static tube 13 is represented as being of a conventional form used on aircraft.

The electron tube 12 comprises a sealed casing or envelope 15 having a plate 16 and a cathode 17 therein. The envelope 12 also contains a heater 18 for heating the cathode in the usual manner for the purpose of producing a flow of electrons from the cathode to the plate. In constructing the electron tube 12 the envelope 15 is evacuated and a small amount of a suitable gas, such as neon gas, is introduced into and sealed in the tube.

As mentioned above the electron tube 12 is responsive to changes in the pressure of the atmosphere and, to this end, is provided with a flexible wall portion which in this instance is in the form of a hollow diaphragm device or bellows 19. The diaphragm device 19 may be formed of a thin flexible sheet material, such as beryllium-copper alloy, and has a sealed connection with the envelope 15 of the electron tube so that the chamber 20 of the diaphragm device will be in direct communication with the interior of the electron tube through the passage 21. The diaphragm device 19 is located in a housing 22 which is connected with the static tube 13 by the conduit 14.

During use of my indicating instrument as an altimeter on an aircraft, the changes occurring in the pressure of the atmosphere due to changes in altitude will be transmitted to the housing 22 through the conduit 14 and will act on the outer surface of the diaphragm device 19. At low altitude the pressure of the atmosphere is relatively greater and tends to collapse the diaphragm device 19 thereby forcing more of the confined gas into the envelope 15 of the electron tube and thus increasing the gas pressure in the latter. At higher altitudes the atmospheric pressure is lower and permits the diaphragm device 19 to expand thus allowing some of the gas to flow out of the electron tube 12 thereby reducing the pressure of the gas in the envelope 15. The flow of electrons from the cathode 17 to the plate 16 varies as the gas pressure changes within the envelope 15, the flow being relatively greater when the gas pressure is low and relatively smaller when the gas pressure is increased.

As shown in the drawing, conductors 24 and 25 are connected respectively with the plate 16 and cathode 17 and provide a plate circuit or output circuit to which a plate voltage of appropriate value may be applied from any suitable source. A pair of conductors 26 connect the heater 18 with a suitable source of heating current. The electric meter 10 is connected with the electron tube as by means of an inductive coupling or transformer 27 having one of its coils 28 located in the plate circuit and the other coil 29 connected in circuit with the meter by the conductors 30 and 31. The use of the coupling 27 in the plate circuit permits the voltage differential to be maintained for all altitudes and, in addition, this coupling serves as an electrostatic shield between the electron tube apparatus 11 and the meter or meters 10.

The meter 10 may be any standard or conventional form of electric meter, such as a galvanometer, having a pointer or needle 32 which is deflected through variable distances depending upon the current or voltage values supplied thereto by the conductors 30 and 31. The meter is also provided with a series of graduations or indications 33 with which the movable pointer 32 cooperates. In this instance the graduations represent altitude measurements in thousands of feet, although the meter could be provided with other scales or markings.

For purposes of calibrating, the plate circuit of the electron tube 12 contains a variable resistance or potentiometer 35 by which the operation of the meter can be adjusted with respect to the functioning of other parts of the indicating apparatus or with respect to the characteristics of the aircraft or various other factors. Such calibration is also necessitated by the fact that some current must flow in the plate circuit at all times even when the reading of the meter 10 is zero.

Although I have shown only one meter 10 in the drawing, a plurality of such meters can be energized or controlled by the electron tube apparatus 11 and can be located at various desired points on the aircraft. Such additional meters would be connected with the coil 29 by simply extending the conductors 30 and 31.

From the foregoing description and the accompanying drawing, it will now be readily understood that I have provided a novel form of indicating instrument by which the direction and extent of change in the pressure of a fluid can be visibly indicated in a sensitive and accurate manner. It will be seen also that by novel indicating instrument is especially suitable for use as an altimeter on various kinds of aircraft.

While I have illustrated and described my indicating instrument in more or less detail, it will be understood, of course, that I do not wish to be correspondingly limited, but regard my invention as including all changes and modifications coming within the scope of the appended claims.

Having thus described my invention, I claim:

1. An instrument of the character described comprising, an electron tube having gas sealed therein and whose electrical output varies in response to changes in the gas pressure in said tube, said tube having a flexible wall portion, an indicator electrically connected with said tube so as to be responsive to variations in said electrical output, and fluid pressure transmitting means connected with said tube and adapted to transmit pressure changes to the tube so as to cause said flexible wall portion to be flexed for varying the pressure of the gas in said tube.

2. An instrument of the character described comprising, an electron tube having gas sealed therein and whose electrical output varies in response to changes in the gas pressure in the tube, said tube having a wall portion adapted to be flexed for varying the gas pressure in the tube, and a meter electrically connected with said tube so as to be responsive to variations in its electrical output.

3. An altimeter comprising, an electron tube having gas sealed therein and whose electrical output varies in response to changes in the gas pressure in the tube, an indicator electrically connected with the tube so as to be responsive to variations in its electrical output, said tube having a wall portion adapted to be flexed for varying the pressure of the gas in the tube, means connected with said tube so as to form a chamber for enabling fluid pressure changes to act on said wall portion, and conduit means connected with said chamber and adapted to transmit fluid pressure changes thereto in response to changes in atmospheric pressure.

4. An instrument of the character described comprising, an electron tube having a sealed envelope containing gas and whose electrical output varies in response to changes in the gas pressure in the envelope, said envelope including a hollow flexible member, a housing for said hollow member, means for conducting pressure fluid fluctuations to said housing so as to act on said hollow member, and an indicator electrically connected with said tube so as to be responsive to variations in its electrical output.

5. An instrument for an aircraft having a static tube comprising, an electron tube having a sealed envelope containing gas and whose electrical output varies in response to changes in the gas pressure in the envelope, said envelope including a flexible wall portion, a meter electrically connected with said electron tube so as to be responsive to variations in the electrical output thereof, means connected with said tube so as to form a chamber for enabling fluid pressure to act on said wall portion, and means connecting said chamber with said static tube so that pressure changes in the latter will act through said wall portion to cause variations in the electrical output of said electron tube.

6. An instrument for an aircraft having a static tube comprising, an electron tube having gas sealed therein and whose electrical output varies in response to changes in the gas pressure therein, a meter electrically connected with said electron tube so as to be responsive to variations in its electrical output, said electron tube having a flexible wall portion, and means connecting said electron tube with said static tube so that pressure changes in the latter will act through said flexible wall portion to cause corresponding changes in the pressure of the gas in said electron tube.

ASA REN LEE.